United States Patent [19]
Krishnamurthy et al.

[11] Patent Number: 4,816,039
[45] Date of Patent: Mar. 28, 1989

[54] PSA MULTICOMPONENT SEPARATION UTILIZING TANK EQUALIZATION

[75] Inventors: Ramachandran Krishnamurthy, Cranbury; Steve L. Lerner, Berkeley Heights; Donald L. MacLean, Annandale, all of N.J.

[73] Assignee: The Boc Group, Inc., Montvale, N.J.

[21] Appl. No.: 59,172

[22] Filed: Jun. 11, 1987

Related U.S. Application Data

[63] Continuation of Ser. No. 832,280, Feb. 24, 1986, abandoned.

[51] Int. Cl.⁴ .............................................. B01D 53/04
[52] U.S. Cl. .......................................... 55/26; 55/58; 55/62; 55/66; 55/68; 55/75
[58] Field of Search .................... 55/25, 26, 58, 62, 66, 55/68, 75

[56] References Cited
U.S. PATENT DOCUMENTS

| | | | |
|---|---|---|---|
| 3,142,547 | 7/1964 | Marsh et al. | 55/62 X |
| 3,788,036 | 1/1974 | Lee et al. | 55/62 X |
| 3,797,201 | 3/1974 | Tamura | 55/62 |
| 3,977,845 | 8/1976 | Walter | 55/25 |
| 4,021,210 | 5/1977 | Streich et al. | 55/62 X |
| 4,077,780 | 3/1978 | Doshi | 55/62 X |
| 4,194,890 | 3/1980 | McCombs et al. | 55/25 X |
| 4,264,339 | 4/1981 | Jüntgen et al. | 55/25 |
| 4,340,398 | 7/1982 | Doshi et al. | 55/62 X |
| 4,381,189 | 4/1983 | Fuderer | 55/62 X |
| 4,415,340 | 11/1983 | Knoblauch et al. | 55/25 |
| 4,461,630 | 7/1984 | Cassidy et al. | 55/62 X |
| 4,468,237 | 8/1984 | Fuderer | 55/62 X |
| 4,477,265 | 10/1984 | Kumar et al. | 55/62 X |
| 4,482,361 | 11/1984 | Whysall | 55/62 X |

Primary Examiner—Robert Spitzer
Attorney, Agent, or Firm—Larry R. Cassett; Chris P. Konkol

[57] ABSTRACT

The inclusion of one or more tanks in a two-bed pressure swing adsorption system provides for a further reduction in the pressure from which each bed is vented. According to the invention, following a bed pressure equalization step, the bed which is to undergo regeneration is equalized with at least one tank, which is at a lower pressure, in order to transfer part of the gas located in the bed void volume. After the bed is regenerated, it is again equalized with the same tank, now at a higher pressure than the bed, in order to return the conserved gas. This process increases yield by decreasing the loss of gas attributable to bed void volume. The combination of the two-bed process with one or more pressure equalization tanks for conserving void gas for subsequent bed repressurization rather than use as purge gas is unique to the present invention. It is best applied to multicomponent gas mixtures, in which a moderately adsorbed component is distributed between a higher pressure primary product stream containing a mildly adsorbed component and a lower pressure secondary product or vent stream containing a strongly adsorbed component. The present process has been applied to increase the yield of argon which is separated from a mixture consisting of hydrogen, argon, nitrogen and methane.

7 Claims, 9 Drawing Sheets

FIG. 4 (PRIOR ART)

| VALVE POSITION \ TIME (SEC) | 5 | 50 | 95 | 5 | 50 | 95 |
|---|---|---|---|---|---|---|
| FEED TO BED A 01 | | ▨ | ▨ | | | |
| FEED TO BED B 02 | | | | | ▨ | ▨ |
| BOTTOM BALANCE A 03 | ▨ | | | | | |
| BOTTOM BALANCE B 04 | | | | ▨ | | |
| BED A VENT 05 | | | | ▨ | ▨ | ▨ |
| BED B VENT 06 | ▨ | ▨ | ▨ | | | |
| TOP BALANCE A 07 | ▨ | | | | | |
| TOP BALANCE B 08 | | | | ▨ | | |
| PRODUCT FROM BED A 09 | | ▨ | ▨ | | | |
| PRODUCT FROM BED B 10 | | | | | ▨ | ▨ |
| ATMOSPHERIC VENT 11 | | | | | ▨ | |
| VENT TO VACUUM 12 | | | ▨ | | | |

FULL CYCLE SEQUENCE

▨ OPEN   ☐ CLOSED

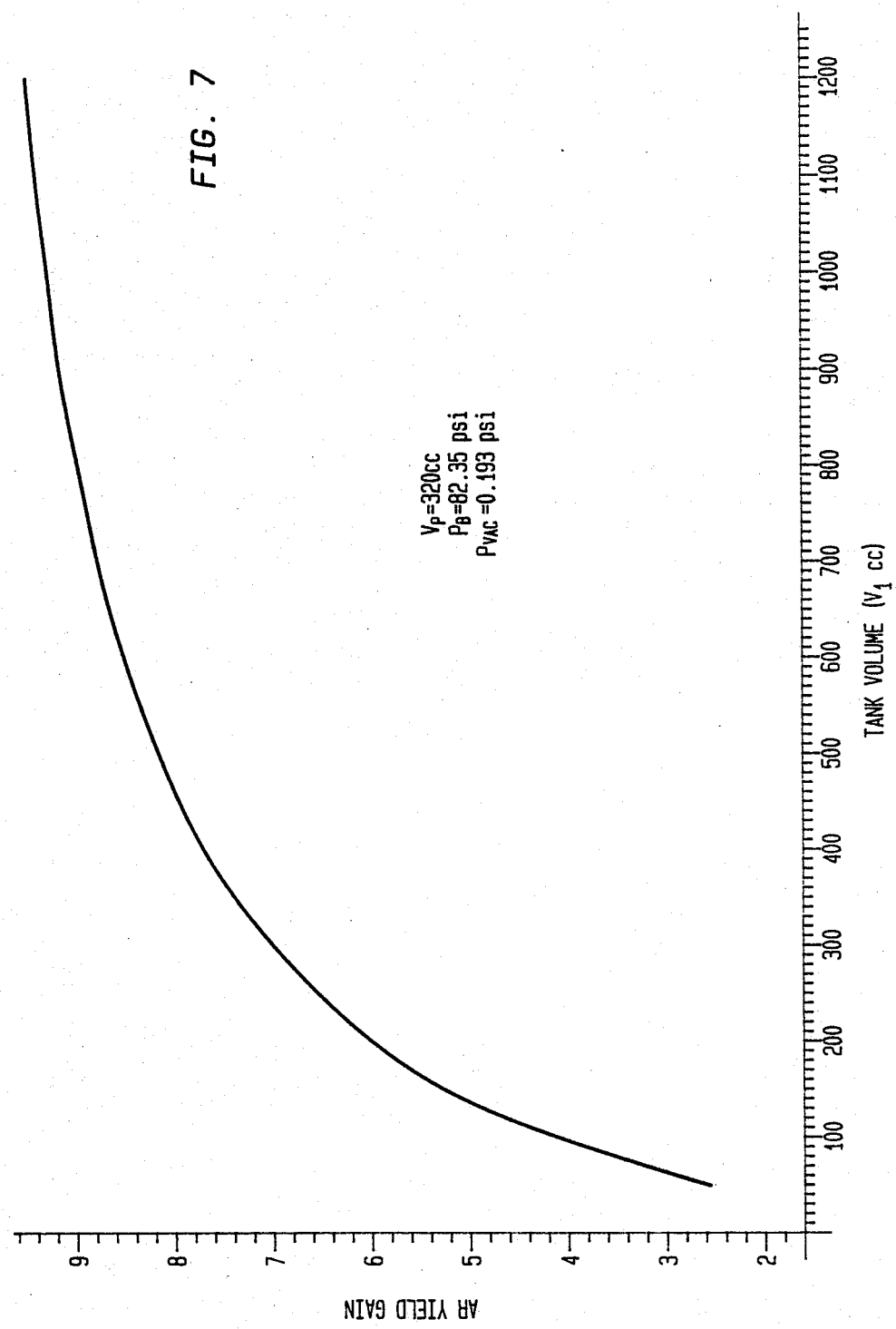

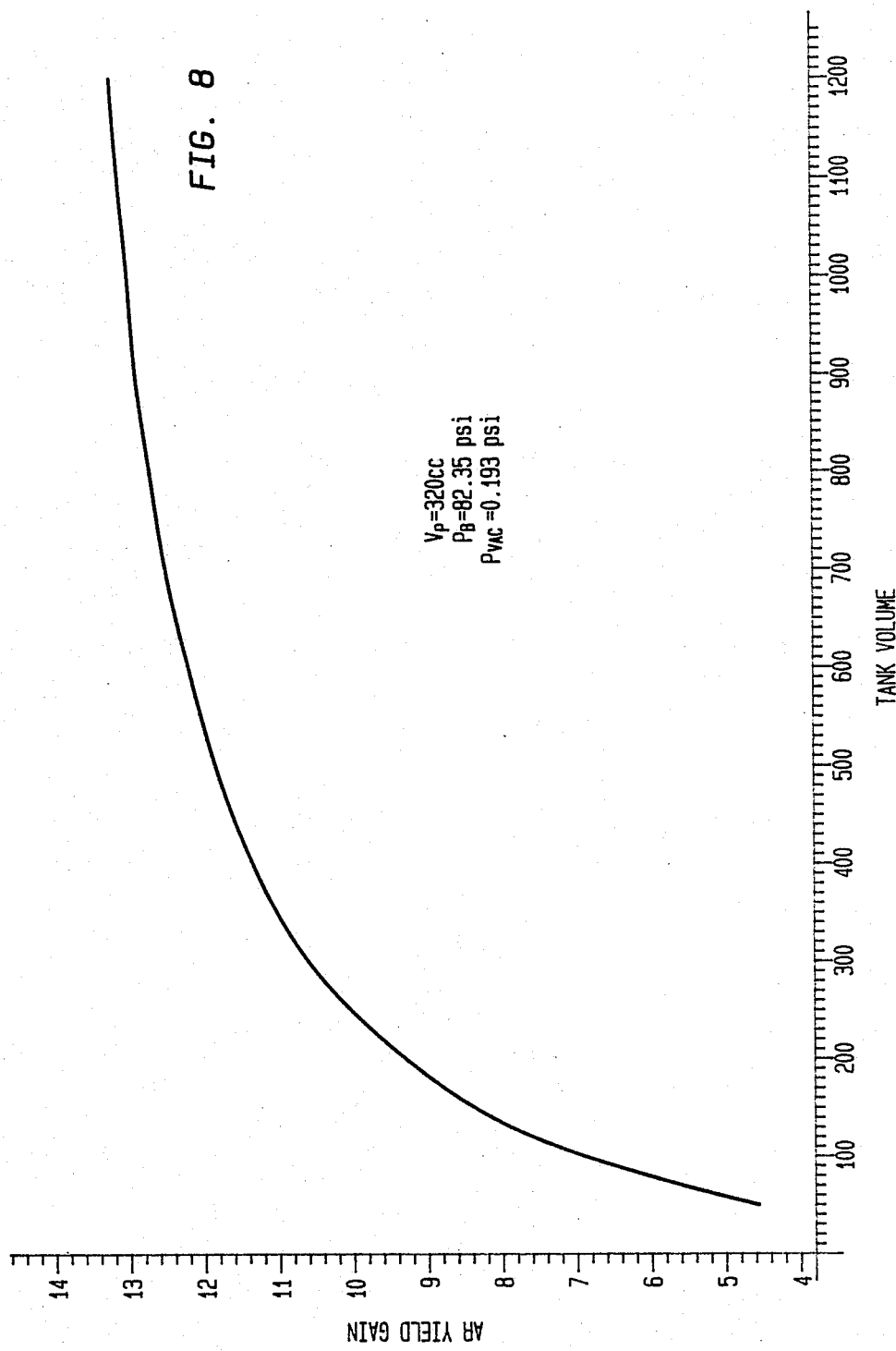

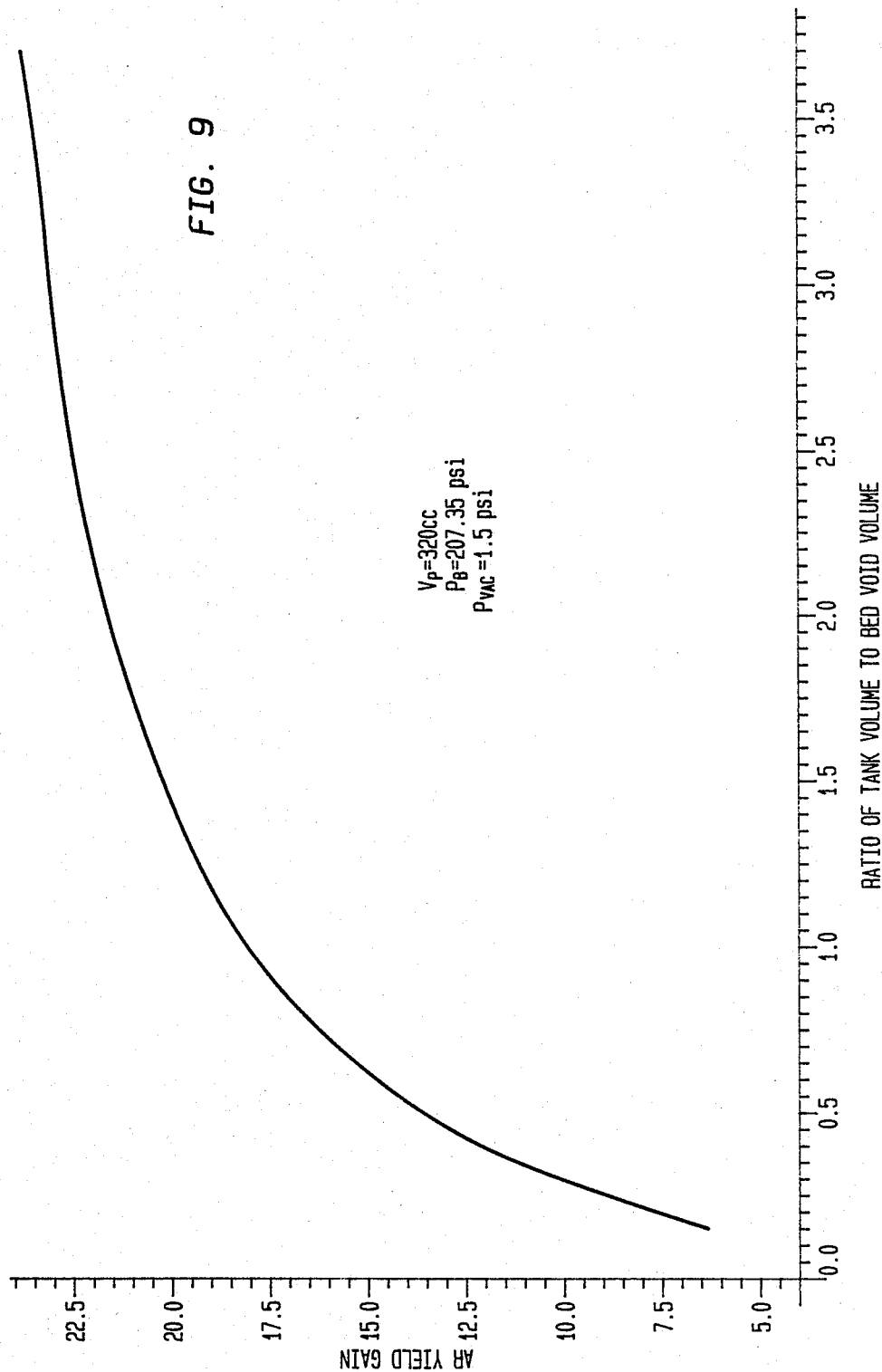

PSA MULTICOMPONENT SEPARATION UTILIZING TANK EQUALIZATION

This is a continuation of co-pending application Ser. No. 832,280, filed on Feb. 24, 1986, now abandoned.

BACKGROUND OF THE INVENTION

Pressure swing adsorption (PSA) is commonly used to separate a multicomponent feed gas into two streams: a primary product at high pressure, rich in one or more mildly adsorbed components and a low pressure secondary product, rich in one or more strongly adsorbed components. Any intermediate components that are moderately adsorbed are split between the two products.

The operating sequence for a conventional 2-bed PSA process typically consists of bed pressurization, product release, and regeneration stages. In the prior art it is common to also include in the operating sequence, a bed pressure equalization step, in order to reduce the pressure from which the bed to be regenerated is vented.

For a given bed design, sieve capacity and operating pressure, the time periods for each of the steps of the operating sequence mentioned above are normally chosen so that when the concentration of the strongly adsorbed component reaches a specified limit in the primary product, the product release step is halted and the bed is regenerated. For a system operating under these conditions, a major loss of weakly adsorbed components occurs due to their presence in the gas located in the bed void space or weakly bound to the adsorbent which is vented during the regeneration stage. The higher the operating pressure, the greater is this loss.

U.S. Pat. No. 4,340,398, issued to Doshi et al. discloses a process for a PSA system containing three or more beds wherein void gas is transferred to a tank prior to bed regeneration, thereby reducing the pressure from which the bed vents, and later using this gas for repressurization. The primary purpose of Doshi et al.'s invention is to separate the product backfill step and bed equalization step, in order to obtain a more uniform product with no discontinuity. The separation of the two steps is achieved through a storage vessel which primarily serves as a buffer tank for backfill gas. Doshi et al. suggest equalization of the bed to the tank simultaneously with the product backfill into the tank. Consequently, only a small portion of the void gas can be drawn into the tank and, hence, the advantage of tank equalization in the present invention is not fully realized by Doshi et al.

Void gas loss can be minimized by reducing the pressure from which the bed vents. A process modification to the 2-bed PSA, incorporating tank equalization has been proposed in the literature. (See, e.g. Lee, H. and Stahl, D. E., "Pressure Equalization and Purging System for Heatless Adsorption Systems", U.S. Pat. No. 3,788,036, issued on Jan. 29, 1974; Marsh, W. D., Holce, R. C., Pramuk, F. S. and Skarstrom, C. W., "Pressure Equalization depressuring in heatless adsorption", U.S. Pat. No. 3,142,547, issued on July 28, 1964). The modification proposed in both patents, which has been recommended for zeolite PSA systems producing either oxygen from air or hydrogen from a hydrogen/hydrocarbon mixture, consists of equalizing the bed with a tank after bed equalization in order to transfer part of the bed void gas, and subsequently using the conserved gas as purge gas to aid regeneration of the bed. The tank gas, obtained from the bed void space, contains less of the desired (mildly adsorbed) component than the product gas. Consequently, for a process using product purge for regeneration, the tank modification reduces the product purge requirement and improves the yield. In the single bed PSA embodiment suggested in U.S. Pat. No. 3,788,036, two tanks are used; the first equalization tank is used to conserve void gas for repressurization while the void gas conserved by a second equalization tank is used as a purge. The first equalization tank in this case fulfills the function of the bed pressure equalization in the 2-bed process. The process suggested with 2-beds includes only one tank which conserves void gas for use as purge.

Void gas conserved by pressure equalization with a tank can be used either as a purge gas or for repressurization. In order to improve the yield of the mildly adsorbed components in the primary products by repressurization, conserved void gas for repressurization can only contain strongly adsorbed components in concentrations slightly above that in the primary product itself. If the strongly absorbed component is present in concentrations much higher than the product specification, the conserved void gas can at best be used as purge gas and the improved yield of the weakly adsorbed component is modest. Even when used as a purge gas, the conserved void gas can only contain strongly adsorbed components in concentrations lower than their corresponding feed concentration. At the end of the production cycle, the void gas is very rich in the mildly absorbed components and the concentration of strongly adsorbed components is very small and close to that in the primary product. Hence it is important to save this gas for repressurization. The bed pressure equalization in a 2-bed process is included for this purpose. At the end of bed pressure equalization, the pressure in the bed that has just been produced is lower and the concentration of the strongly adsorbed component starts to build up in the bed void gas due to desorption as the equilibrium changes with lower pressure. Therefore, when only stongly or mildly adsorbed components are present, tank equalization following bed pressure equalization to conserve void gas can only be used to provide purge gas for bed regeneration. Mildly adsorbed components in the void gas are lost in the purge gas.

The above analysis applies to systems which contain mildly adsorbed or strongly adsorbed components. This is the case in the separations described in U.S. Pat. No. 3,788,036 (oxygen from nitrogen) and in U.S. Pat. No. 3,142,547 (hydrogen from hydrocarbons). The present invention is particularly concerned with separations involving multicomponent gas mixtures which contain moderately adsorbed component(s) apart from strongly adsorbed and mildly adsorbd components. Downstream processing requires that the primary product contain less than a specified concentration of the strongly adsorbed components. The moderately adsorbed component(s) can, however, be tolerated either in the primary product or in the secondary product over a range of concentrations. The separation of multicomponent systems that come under this category are slightly different from systems studied hitherto and hence permit effective use of one or more tank equalizations following bed pressure equalization for the purpose of conserving void gas for subsequent bed repressurization.

In the case of systems containing a moderately adsorbed component, the void gas (at the end of the production cycle) is rich in mildly adsorbed components and contain small to moderate amounts of moderately adsorbed components and low concentrations, at or below product specification, of strongly adsorbed components. Following bed pressure equalization, the moderately adsorbed components readily desorb and strongly adsorbed components are still in the adsorbed phase. The void gas is now rich in the moderately adsorbed component with significant amounts of the mildly adsorbed component. This gas is conserved by tank equalization and still meets the requirement for use as repressurization gas to improve yield. The tank equalizations can be continued until the strongly adsorbed components start to desorb and their concentration level in the void gas becomes appreciable. The moderately adsorbed component(s) thus provide a buffer range over which tank equalizations are effective for producing repressurization gas. The yield of the mildly adsorbed component is improved appreciably through the tank equalizations with a concurrent change in the ratio in which the moderately adsorbed component(s) distributes in the primary and secondary products.

The combination of a 2-bed PSA with one or more pressure equalization tanks for the purpose of improving yield of mildly adsorbed components in the primary product by conserving gas for subsequent use in bed repressurization is unique to this invention. This combination is very effective when one or more of the following conditions are met:

(i) A moderately adsorbed component that is permitted to distribute between the primary and secondary products is present.

(ii) The feed gas is at very high pressure and the PSA operation is carried out at pressures higher than the optimum PSA operative pressure for the purpose of conserving pressure energy in the primary product for downstream processing. In this case, the tank equalization provides a mechanism by which the desorbing pressure can be maintained at optimum level irrespective of the adsorption pressure, thereby reducing the loss of mildly adsorbed (desired) component during venting.

(iii) Desired product is very valuable and hence purge containing even small amounts of this gas is not recommended. Vacuum regeneration will then be favored in spite of high associated costs.

(iv) Purge gas is available from an external source and so the conserved void gas can be used for repressurization in its entirety.

An object of the present invention is to increase yield and reduce void gas loss in a 2-bed PSA system separating a multicomponent as feed. Another object of the present invention is to reduce the pressure from which the beds in a PSA system are vented. A further object of the present invention is to employ a single tank or a plurality of tanks to conserve the void gas in a PSA system by equalization with each bed before and after regeneration. Yet a further object of the present invention is to use the tank equalizations as a mechanism to enable PSA operation at high pressures to conserve available pressure energy in the feed for downstream processing while carrying out desorption from very low pressures.

BRIEF DESCRIPTION OF THE INVENTION

According to the present invention, void gas loss is minimized by the addition of one or more empty tanks to the conventional 2-bed pressure swing adsorption system. Two equalization steps are included for each tank during each cycle. Following the bed pressure equalization step, the bed to be regenerated is equalized with a tank at low pressure to transfer part of the void gases to the tank. After complete bed regeneration, the bed is equalized with the tank again to return the conserved gases. In other words, the void gas from each bed is returned to the same bed at the end of the regeneration step. The present invention has application to multicomponent gas mixtures containing a considerable amount of a moderately adsorbed compound that can distribute between the primary product and the vented or secondary product. This allowable distribution provides a buffer range over which the tank equalization is effective.

An example of a multicomponent gas system to which the present invention has application is a high pressure (1900 psig) gas mixture, originating from an ammonia purge gas, comprising an appreciable amount of nitrogen, along with argon, hydrogen, and methane. The nitrogen is a moderately adsorbed compound which can distribute between an argon and hydrogen rich primary product stream and a methane rich secondary product stream.

The objective of the PSA separation is to essentially remove methane completely (down to a given specification, for example, 1 ppm) and as much nitrogen as possible. The PSA product containing hydrogen, argon and nitrogen is then cryogenically distilled to produce pure liquid argon. Methane must be completely removed because any methane in the PSA primary product will concentrate in the pure argon product. Nitrogen, however, can be tolerated over a wide range; argon can be separated as a pure product from a mixture with hydrogen and nitrogen over a wide range of nitrogen concentrations in a single column. Incremental amounts of nitrogen have little effect on the column separation costs and hence in the PSA separation, since minimizing the amount of nitrogen in the primary product is secondary to maximizing argon yield.

In the PSA separation, the nitrogen is desorbed before the methane as the pressure is reduced, and the bed pressure reduction, via tank equalization, can be continued over a range of pressures before methane desorption starts. Nitrogen therefore acts as a buffer component in this particular application of the present invention.

It is also important to note that the feed stream is available at a very high pressure in this case. The PSA must be operated at a high pressure to eliminate recompression for downstream separation. The tank equalizations provide a mechanism to operate the PSA at a desired high pressure to get primary product at this pressure whereas the pressure is decreased to a very low level before initiating bed venting to obtain a high argon yield.

BRIEF DESCRIPTION OF THE DRAWINGS

The invention will be more clearly understood by reference to the following description of exemplary embodiments thereof in conjunction with the following drawings in which:

FIG. 4 is a chart diagram showing the prior art timing and valve position during a cycle sequence, when practicing the prior art system illustrated in FIG. 3 and Example 1 below;

FIG. 7 is a graph showing the increase in argon yield compared to the prior art in relation to the ratio of tank volume to bed void volume according to a process employing a single tank embodiment of the present invention. The primary product is obtained at 150 psig pressure.

FIG. 8 is a graph showing the increase in argon yield compared to prior art in relation to the ratio of tank volume to bed void volume according to a process employing a two tank embodiment of the present invention. The primary product is obtained at 150 psig pressure.

FIG. 9 is a graph showing the increase in argon yield compared to prior art in relation to the ratio of tank volume to bed void volume according to a process employing a single tank embodiment of the present invention. The primary product is obtained at 400 psig as opposed to 150 psig in FIG. 7 and hence this illustrates the utility of tank equalizations for conserving available feed pressure energy.

DETAILED DESCRIPTION OF THE INVENTION

The present invention improves product yield in multi-component bulk separations. Inclusion of at least one tank to the conventional 2-bed PSA process improves the yield of mildly adsorbed components by reducing the bed void gas loss.

Figure 1:
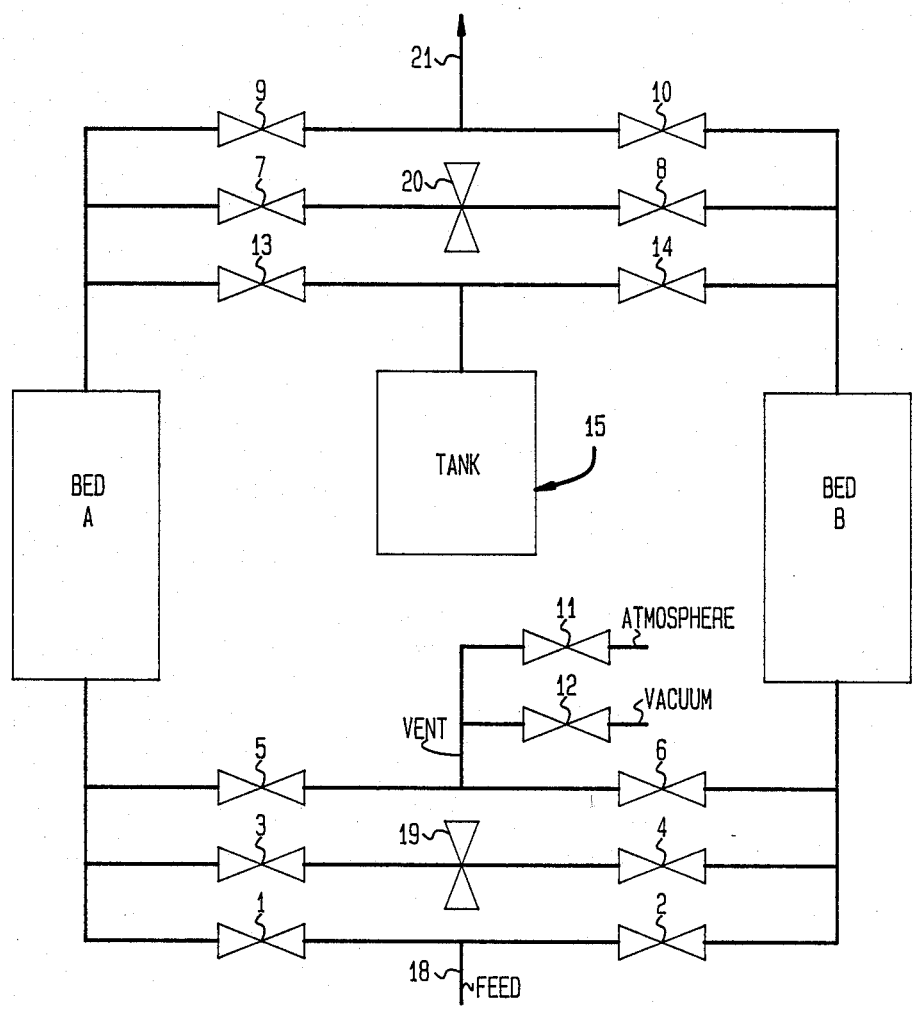
FIG. 1 is a schematic flow diagram of an improved pressure swing adsorption system according to the present invention, comprising a single tank for equalization.

Referring to FIG. 1, the feed gas stream 18 containing a multicomponent mixture of gases enters the 2-bed system, during which valves 1 and 14 are opened, and the other valves are closed. Bed A is thereby pressurized by the feed gas to a preselected pressure. Meanwhile, the pressure in Bed B is equalized with tank 15 via valve 14. Following equalization with the tank, Bed B is vented to the atmosphere by closing valve 14 and opening valves 6 and 11.

Upon reaching a preselected pressure in Bed A, the primary product is released from Bed A by opening valve 9 thereby yielding a product stream 21 rich in mildly adsorbed components. Meanwhile, Bed B is exposed to vacuum regeneration by closing valve 11 and opening valve 12. Following vacuum regeneration of Bed B, and while product release continues in Bed A, equalization of the pressure in Bed B with tank 15 occurs by closing valves 12 and 6 and opening valve 14. Thus, the high pressure void gas that had been sent to the equalization tank prior to regeneration is recovered for further treatment. Following the second equalization of Bed B, the Bed A and Bed B are equalized by closing valves 1, 9, and 14 and opening valves 3, 4, 7, and 8. Located betwixt valves 3 and 4 and betwixt valves 7 and 8 are needle valves 19 and 20, respectively, set to obtain a suitable gas flow rate.

The previous steps of the cycle are analogously repeated, except that Bed A and Bed B are reversed with respect to feed pressurization and regeneration. Following bed balance, valves 3, 4, 7, and 8 are closed and valves 2 and 13 are opened. This configuration permits equalization of Bed A with tank 15 and feed pressurization of Bed B. By closing valve 13 and opening valves 5 and 11, Bed A is vented, while Bed B continues to pressurize via valve 2. The pressurized Bed B is then permitted product release by opening valve 10. Meanwhile Bed A undergoes vacuum regeneration by closing valve 11 to the atmosphere, and opening valve 12 to vacuum. Next, following regeneration of Bed A, equalization with tank 15 is achieved by closing valves 5 and 12 and opening valve 13. Thus, the high pressure void gas is returned to Bed A. Finally, following equalization of Bed A and the completion of product release, the Bed A and Bed B are balanced by closing valves 2 and 10, thereby stopping gas flow through Bed A, and closing valve 13 leading to the tank, while opening valves 3, 4, 7, and 8, thereby permitting gas flow between the beds.

Figure 2:
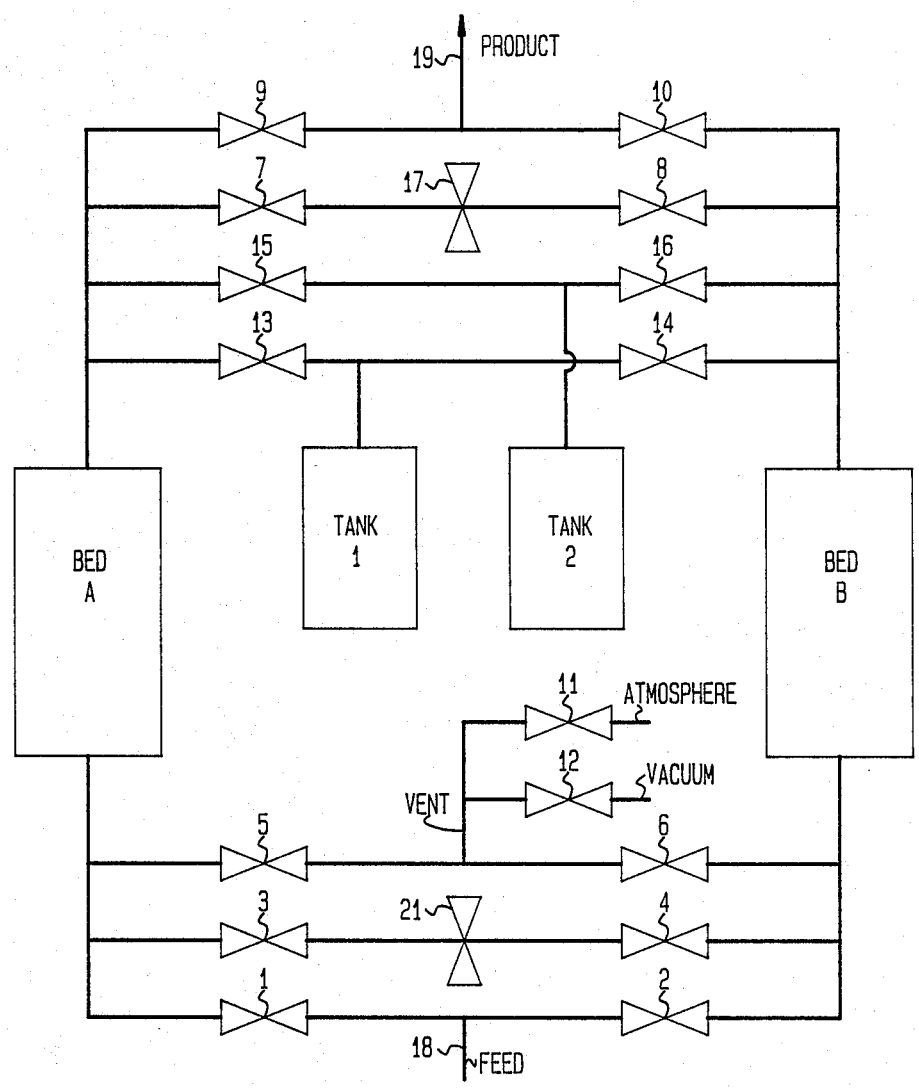
FIG. 2 is a schematic flow diagram of an improved pressure swing adsorption system according to the present invention, comprising two tanks for equalization.

Referring now to FIG. 2, the feed gas stream 18, containing a multicomponent mixture of gases, enters the 2-bed pressure swing adsorption system. Valves 1 and 4 are opened, whereas the other valves are closed. The first Bed A is thereby pressurized by the feed gas to a preselected pressure. Meanwhile, the pressure in Bed B is equalized with a first tank 1 via valve 14. Following equalization with tank 1, valve 14 is closed as valve 16 is opened to accomplish equalization with a second tank 2, while first bed A continues to be pressurized with feed gas stream 18. Following this second tank equalization, the second bed B is vented to the atmosphere by closing valve 16 and opening valves 6 and 11.

Upon reaching a preselected pressure in first bed A, the primary product is released from first bed A, by opening valve 9, in addition to already opened valve 1, thereby yielding a product stream 19 rich in mildly adsorbed components. Meanwhile, second bed B is exposed to vacuum regeneration by closing valve 11 and opening valve 12, thereby accomplishing communication of the second bed B with a source of vacuum. Following vacuum regeneration of second bed B, and while product release continues in bed A, a second equalization of the pressure in second bed B occurs by closing valves 6 and 12 and opening valve 16. Thus, the void gas that has been sent to the second stage equalization tank prior to regeneration is recovered for further treatment. Next, the valve 16 is closed and valve 14 is opened to accomplish another second stage equalization with the tank 1. Following the second stage equalization of Bed B, to accomplish recovery of the void gas, the first bed A and second bed B are pressure equalized by closing valves 1, 9, and 14, and opening valves 3, 4, 7 and 8. Located betwixt valves 3 and 4 and betwixt valves 7 and 8 are needle valves 21 and 17, respectively, set to obtain a suitable gas flow rate.

The previous steps of the cycle are analogously repeated, except that first bed A and second bed B are reversed with respect to feed pressurization product release, and regeneration steps as now described. Following bed balance, valves 3, 4, 7, and 8 are closed and valves 2 and 13 are opened. This configuration permits equalization of bed A with tank 1 and feed pressurization of second bed B. By closing valve 13 and opening valve 15, the first bed A is equalized with tank 2. Next, by closing valve 15 and opening valves 5 and 11, first bed A is vented, while second bed B continues to be pressurized via valve 2. The pressurized bed B is then permitted product release by opening valve 10. Meanwhile, Bed A undergoes vacuum regeneration by closing valve 11 to the atmosphere, and opening valve 12 to vacuum. Next, following regeneration of first bed A, second stage equalization of the first bed A with tank 2 is achieved by closing valves 5 and 12 and opening valve 15, thereby recovering void gas.

Another second stage equalization, this time with tank 1, is accomplished by closing valve 15 and opening valve 13. Finally, following the completion of the tank equalization of first bed A and the completion of product release by second bed B, the beds are balanced by closing valves 2, 10, and 13, and opening valves 3, 4, 7, and 8, thereby permitting gas flow between the beds.

Although having general applicability, the invention is illustrated in a process to recover argon from ammonia synthesis plant purge gas. The objective of PSA, in this case, is to separate argon as a primary high pressure product from a feed available at 1900 psig and consisting of four components having the following typical composition: 9% $H_2$, 12% Ar, 54% $N_2$ and 25% $CH_4$. Hydrogen is more weakly adsorbed than argon and will separate with argon in the primary product. In contrast, methane is strongly adsorbed and is the major component in the low pressure secondary product. Nitrogen is moderately adsorbed and will distribute between the two products. For an efficient operation of the process, the variables are adjusted so that methane concentration in the primary product is below a given specification and the argon yield in the primary product is maximized. Although the nitrogen in the primary product is to be minimized, this is of secondary importance compared to maximizing argon yield.

COMPARATIVE EXAMPLE 1

Figure 3:
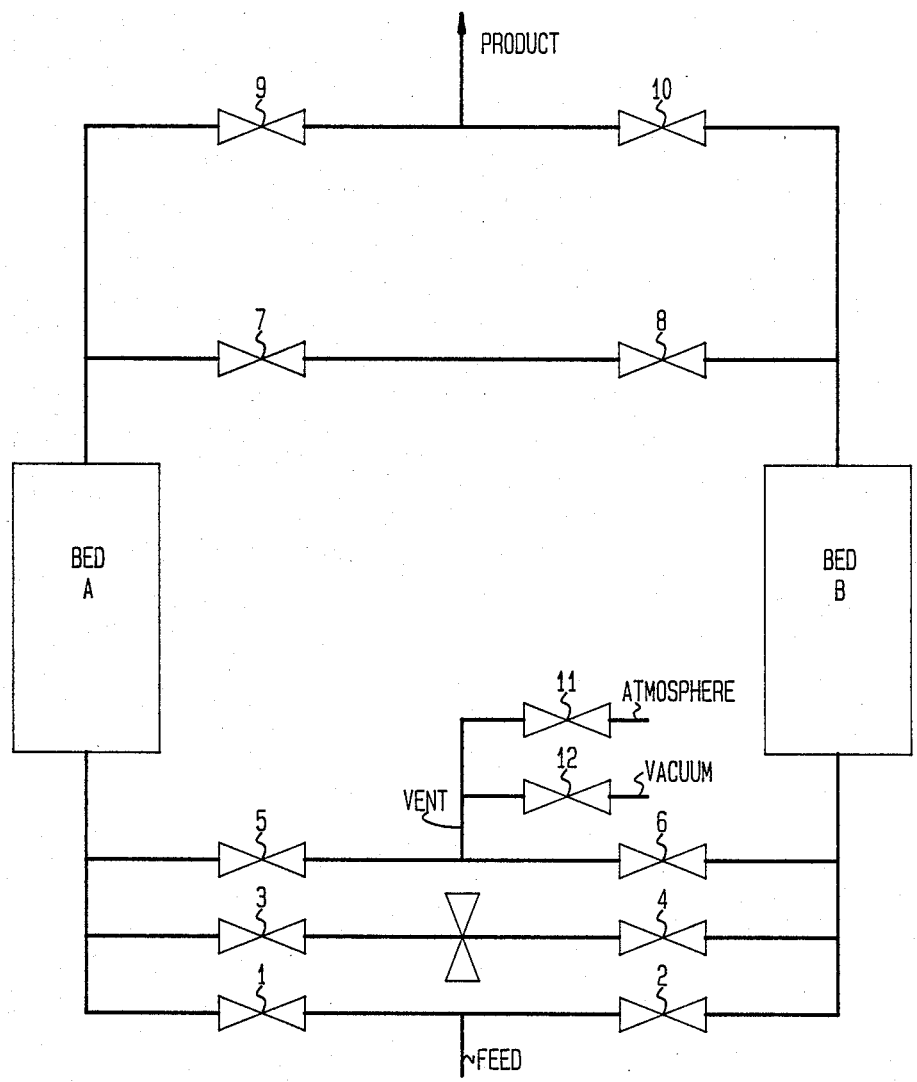
FIG. 3 is a schematic flow diagram of a prior art pressure swing adsorption system.

A conventional 2-bed PSA process was employed for effecting the separation of a gaseous mixture comprising hydrogen, argon, nitrogen and methane. A flow diagram of a conventional 2-bed PSA is shown in FIG. 3. Each of the two PSA beds were approximately 650 cc in volume and contained 5A medical grade zeolite molecular sieve adsorbent material (commercially obtained from Union Carbide). The primary product was withdrawn at 150 psig (10.34 bars) pressure and the regeneration was carried out at a vacuum of 1.5 psia (100 mbar). A 5 minute full cycle was employed according to the following cycle sequence:

| Step | Bed A | Bed B |
|---|---|---|
| 1 | Bed Pressure equalization | |
| 2 | Pressurization and Product release | Vent to atmospheric Pressure |
| 3 | Constant feed and Product release | Vacuum regeneration |
| 4 | Bed pressure equalization | |
| 5 | Vent to atmospheric pressure | Pressurization and product release |
| 6 | Vacuum regeneration | Constant feed and product release |

The timing and valve positions are shown in FIG. 4. The primary product flow was maintained at approximately 27.2% of feed flow (for both flows averaged over a cycle). For a given cycle of PSA operation, this condition was determined to be the optimum for maximizing argon yield while meeting methane product specification. At steady state, the product composition was 31.5% $H_2$, 29.5% Ar and 39.0% $N_2$. The argon yield was 68 percent corresponding to an allowable product methane concentration up to the detection limit of a thermal conductivity analyzer (less than 20 ppm).

EXAMPLE 2

A system according to the present invention (FIG. 1) was compared to the conventional system of Comparative Example 1 above. The same gaseous mixture and PSA beds were employed. The PSA operating pressure was at 150 psig and the regeneration pressure was at a vacuum of 1.5 psia. Inclusion of a 300 ml tank (the ratio of tank volume to bed void volume was approximately one) with the normal 2-bed PSA system was operated in according with the following 5 minute cycle sequence:

| Step | Bed A | Bed B |
|---|---|---|
| 1 | Bed pressure equalization | |
| 2 | Pressurize | Equalize with tank |
| 3 | Pressurize and product release | Vent to atmosphere |
| 4 | Constant feed and product release | vacuum regeneration |
| 5 | Constant feed and product release | Equalize with tank |
| 6 | Bed pressure equalization | |
| 7 | Equalize with tank | Pressurize |
| 8 | Vent to atmosphere | Pressurize and product release |
| 9 | Vacuum regeneration | Constant feed and product release |
| 10 | Equalize with tank | Constant feed and product release |

Figure 5:
FIG. 5 is a chart diagram showing the present invention timing and valve positions during a cycle sequence, when practicing the system illustrated in FIG. 1 and Example 2 below.

The timing and valve positions are shown in FIG. 5. The product to feed flow ratio was optimized for maximum argon yield at specified methane product specification and was determined to 0.3. With allowable product methane concentration below 20 ppm, the steady state product consisted of 25.3% $H_2$, 31.2% Ar and 43.5% $N_2$. The argon yield in primary product was 75 percent. This represents a 7 percentage points yield increase due to the tank equalization steps according to the present invention.

EXAMPLE 3

Two equalization tanks of 300 ml were tested in a 2-bed pressure swing adsorption system according to the present invention (FIG. 2). Otherwise, the gaseous mixture and PSA beds were the same as employed in comparative Example 1 and Example 2 above. The following cycle sequence was run:

| Step | Bed A | Bed B |
|---|---|---|
| 1 | Bed pressure equalization | |
| 2 | Pressurize | Equalize with tank 1 |
| 3 | Pressurize | Equalize with tank 2 |
| 4 | Pressurize and product release | Vent to atmosphere |
| 5 | Constant feed and product release | Vacuum regeneration |
| 6 | Constant feed and product release | Equalize with tank 2 |
| 7 | Constant feed and product release | Equalize with tank 1 |
| 8 | Bed pressure equalization | |

| | Bed A | Bed B |
|---|---|---|
| 9 | Equalize with tank 1 | Pressurize |
| 10 | Equalize with tank 2 | Pressurize |
| 11 | Vent to atmosphere | Pressurize and product release |
| 12 | Vacuum regeneration | Constant feed and product release |
| 13 | Equalize with tank 2 | Constant feed and product release |
| 14 | Equalize with tank 1 | Constant feed and product release |

Figure 6:
FIG. 6 is a chart diagram showing the present invention timing and valve positions during a cycle sequence, when practicing the system illustrated in FIG. 2 and Example 4 below.

The timing and valve positions are shown in FIG. 6. Inclusion of two tanks of equal volume (300 ml) in the 2-bed pressure swing adsorption process increased argon yield from 68 to 78 percent.

The contents of the tank, after the higher pressure equalization, was analyzed for a number of experiments. The composition was in the range 0–3% $H_2$; 13–16% Ar, 81–87% $N_2$ and very low ppm level $CH_4$. This indicates that void gas losses are important and the modification employing a tank is advantageous.

In the above described processes employing an equalization tank, each regenerating bed is equalized twice with the tank. In the first equalization, just after bed balance, part of the void gases in the bed is transferred to the tank. During the second equalization, after complete regeneration of the bed, the tank is at a higher pressure and hence the conserved gases are now returned. Since void gas loss is thus minimized, the product yield is increased. We next turn to an analysis of the relationship of tank volume to the product yield.

The tank volume is an important variable affecting the amount of gas that is transferred and conserved. The improvement due to the inclusion of an equalization tank according to the present invention, can be related to two quantities: first, the higher tank equalization pressure which is the final pressure from which the bed is vented, and second, the product of the tank volume and the difference between the two tank equalization pressures. The variables are defined as follows:

| | |
|---|---|
| $p_B$ = | the bed balance pressure for the 2-bed process |
| $p_{vac}$ = | the final regeneration pressure |
| $V_b$ = | the total bed volume |
| $E$ = | the porosity |
| $V_p$ = | $V_b \times E$, the bed void volume |
| $V_1$ = | the tank volume |
| $V_R$ = | $V_1/V_p$, the ratio of tank volume to bed void volume |
| $p_H$ = | the higher tank equalization pressure |
| $p_L$ = | the lower tank equalization pressure |
| $Y_{HAr}$ = | Argon concentration of high pressure tank gas |
| $Y_{LAr}$ = | Argon concentration of low pressure tank gas |
| $K$ = | proportionality factor |

For a given volume of the tank $V_1$, at the higher pressure equalization, a bed at $p_B$ is equalized with a tank at $p_L$. Assuming that the temperature over the bed and the tank are the same, $$p_H = \frac{p_B V_p + p_L V_1}{(V_p + V_1)} \quad (1)$$

At the lower end equalization, a bed at $p_{vac}$ is equalized with a tank at $p_H$.

$$p_L = \frac{p_{vac} V_p + p_H V_1}{(V_p + V_1)} \quad (2)$$

Solving equations 1 and 2 for $p_H$, we obtain the following:

$$p_H = \frac{p_B V_p (V_p + V_1) + p_{vac} V_p V_1}{(V_T^2 - V_1^2)} \quad (3)$$

With $p_H$ known from equation (3), $p_L$ can be determined from equation (2).

The higher tank equalization pressure (pressure from which the bed vents) $p_H$ decreases with $V_1$, and $p_L$ increases with $V_1$. A larger tank volume increases the argon yield by reducing $p_H$, but ultimately when $p_H$ approaches $p_L$, there is no incremental gain in argon yield. The gain in argon yield is proportional to ($p_H$ $y_{HAr} - p_L Y_{LAr}$) $V_1$ or ($p_H - p_L$) $V_1$, assuming $y_{HAr} = y_{LAr}$. The yield gain can be defined as follows:

Yield Gain = K $(p_H - p_L) V_1$

The proportionality factor can be determined by experimentally determining the gain at a particular $V_1$.

EXAMPLE 4

This example illustrates how the dependence of product yield on tank volume can be determined for a given system. The same gaseous mixture and PSA beds were employed as in Example 2 above, and the same cycle sequence described in Example 2 was followed. A $p_B$ of 82.35 psia and a $p_{vac}$ of 1.5 psia was measured. The proportionality factor was determined by setting the experimentally obtained gain in yield at 7 percentage points in equation (4) above. Referring to FIG. 7, the gain in argon yield was plotted against the ratio of tank volume to bed void volume, $V_R$. As expected, the gain increases with $V_R$. However, the rate of increase (slope) decreases rapidly after $V_R = 2$. The maximum gain in argon yield for this case is about 9 percentage points.

The above analysis can be carried out for a plurality of tanks. For example, for a "2-bed plus 2-tank" process using equalizations with 2 tanks in sequence, the following analysis can be made. The variables are defined as follows:

| | | |
|---|---|---|
| $p_{H1}, p_{L1}$ | = | the upper and lower equalization pressures for the 1st tank |
| $p_{H2}, p_{L2}$ | = | the upper and lower equalization pressures for the 2nd tank |
| $V_1$ and $V_2$ | = | the tank volumes |

The equations for the pressure equalizations at constant system temperature are as follows:

I. First tank

Higher end:
$$p_{H1} = \frac{p_B V_p + p_{L1} V_1}{(V_p + V_1)} \quad (4)$$

Lower end:
$$p_{L1} = \frac{p_{L2} V_p + p_{H1} V_1}{(V_p + V_1)} \quad (5)$$

II. Second tank

-continued

Higher end:
$$p_{H2} = \frac{p_{H1}V_p + p_{L2}V_2}{(V_p + V_2)} \quad (6)$$

Lower end
$$p_{L2} = \frac{p_{vac}V_p + p_{H2}V_2}{(V_p + V_2)} \quad (7)$$

The equations (4) through (7) are expressed in matrix form as:

$$\begin{bmatrix} (V_p + V_1) & 0 & -V_1 & 0 \\ -V_p & (V_p + V_2) & 0 & -V_2 \\ -V_1 & 0 & (V_p + V_1) & -V_p \\ 0 & -V_2 & 0 & (V_p + V_2) \end{bmatrix} \begin{bmatrix} p_{H1} \\ p_{H2} \\ p_{L1} \\ p_{L2} \end{bmatrix} =$$

$$\begin{bmatrix} p_B V_p \\ 0 \\ 0 \\ p_{vac} V_p \end{bmatrix}$$

The linear system of equations given above are solved for $p_{H1}$, $p_{H2}$, $p_{L1}$ and $p_{L2}$. Assuming that the argon concentration in the two tanks at the end of both the high pressure and low pressure equalization are equal, the gain in argon yield for the two tank embodiment is proportional to $[(P_{H1}-P_{L1})V_1+(P_{H2}-P_{L2})V_2]$. Further choosing both tank volumes to be equal, $(V_1=V_2)$: Gain in argon yield $=K[(P_{H1}-P_{L1})+(P_{H2}-P_{L2})]V_1$. Assuming that the argon concentration in the tank for the single tank and two tank embodiments are not significantly different (typically, this has been found to be the case because nitrogen is the major component of the tank gas), the same proportionality constant, experimentally determined for the single tank case, can be used again. FIG. 8 shows the gain in argon yield plotted against the ratio of tank volume to bed void volume. In this case, a maximum argon yield of 13 percent over the conventional 2-bed process is obtained. This compares to a 9 percent gain in the single tank embodiment. With the use of equalization tanks, it is thus possible to increase argon yield from 68 percent for a 2-bed process to 77 percent with a single tank and to 81 percent with two tanks. A greater number of tanks is possible. However, the increase in capital costs will eventually outweigh the marginal increase in yield gain from another tank.

EXAMPLE 5

This example illustrates the use of the equalization tank as a mechanism to preserve available feed pressure energy so that the primary product can be produced at high pressure, thereby avoid recompression for downstream processing while maintaining yield. The conventional 2-bed system of comparative example 1 is used again but at a 400 psig pressure instead of 150 psig. An argon yield of 62 percent results as compared to 68 percent at 150 psig. For the conventional 2-bed process, there is a 6 percent drop in yield as the pressure is raised from 150 psig to 400 psig and this is attributed to higher bed void gas loss. Now the theoretical analysis carried out for the single tank embodiment of the present invention is repeated with $P_B=207.35$ psia. Using the proportionality factor determined earlier, the variation of gain in argon yield with ratio of tank volume to bed void volume is calculated and plotted in FIG. 9. At 400 psig operating pressure, an argon yield increase of 22 percentage points is possible. Hence, by including the tank equalization step, the yield at the higher pressure can at least be maintained at the same yield as the low pressure PSA operation or even increased.

The above described embodiments are illustrative, but not limitative of the present invention for using tank pressure equalization to improve product yield. Modifications or variations, within the scope and spirit of the invention, may be apparent to those skilled in the art.

We claim:

1. A cyclical process for the separation of a multicomponent gaseous mixture at a high pressure, said multicomponent gaseous mixture comprising at least three components, said cyclical process utilizing a pressure swing adsorption system comprising two beds and at least one tank, wherein said two beds contain an adsorbent material of different selectivity with respect to each of said three components, and said tank is adapted to communicate with both beds, said process comprising in sequence:
   (i) a first pressure equalization of a first adsorption bed with said tank through the product end following top to top and bottom to bottom pressure equalization of the two beds;
   (ii) regeneration of said first adsorption bed;
   (iii) a second pressure equalization of said first adsorption bed with said tank again through the product end, thereby returning conserved high pressure void gas to said first bed;
   (iv) a first pressure equalization of a second adsorption bed with said tank through the product end, following top to top and bottom to bottom equalization of the two beds; and
   (v) regeneration of said second adsorption bed, and second pressure equalization of said second adsorption bed with said tank again through the product end, thereby returning conserved high pressure void gas to said second bed;
   whereby while one bed is pressure equalizing or regenerating, the other bed is being pressurized with feed and producing primary product at high pressure, and whereby at least two streams are produced by each bed, a primary product stream at relatively high pressure, rich in at least one mildly adsorbed component which is a desired high valued final product and a secondary product stream at relatively low pressure, rich in one or more strongly adsorbed component that must not be present in more than trace levels in the primary product, and wherein a component of said multicomponent gaseous mixture, which component is moderately adsorbed and present in significant amounts in said multicomponent gaseous mixture, is permitted to distribute between said primary product stream and said secondary product stream; wherein, the process improvement realized is the high yield of the mildly adsorbed component in the primary product with a concurrent increase in the amount of the moderately adsorbed component going with the primary product.

2. The process of claim 1, wherein said multicomponent gaseous mixture comprises hydrogen, argon, nitrogen, and methane and wherein said argon is said mildly adsorbed component, methane is said strongly adsorbed component, and nitrogen is said moderately adsorbed component.

3. The process of claim 1, wherein said first and second equalization steps of both said first or second bed are repeated with a second tank.

4. The process of claim 1, wherein said first and second equalization steps are repeated with a plurality of tanks.

5. The process of claim 1, wherein said two bed pressure swing adsorption system receives a high pressure feed gas and operates at high pressures to conserve available pressure energy in the primary product stream whereas the bed pressure is lowered significantly through equalizations with one or more tanks, before venting, to reduce bed void gas loss.

6. The process of claim 1, wherein regeneration of said two bed pressure swing adsorption system is carried out by applying a vacuum or through the use of purge gas available from an external source at or slightly above atmospheric pressure.

7. The process of claim 1, wherein a product backfill is included to increase product purity.

* * * * *